(12) United States Patent
Mani

(10) Patent No.: US 10,150,392 B2
(45) Date of Patent: Dec. 11, 2018

(54) COMBAT VEHICLE SEAT INSTALLATION FOR PROTECTION OF OCCUPANTS FROM THE EFFECTS OF GROUND EXPLOSIONS

(71) Applicant: Ayyakannu Mani, Rochester Hills, MI (US)

(72) Inventor: Ayyakannu Mani, Rochester Hills, MI (US)

( * ) Notice: Subject to any disclaimer, the term of this patent is extended or adjusted under 35 U.S.C. 154(b) by 0 days.

(21) Appl. No.: 15/440,709

(22) Filed: Feb. 23, 2017

(65) Prior Publication Data

US 2017/0320411 A1 Nov. 9, 2017

Related U.S. Application Data

(60) Provisional application No. 62/299,040, filed on Feb. 24, 2016.

(51) Int. Cl.
*B60N 2/42* (2006.01)
*B60N 2/427* (2006.01)
*B60N 2/38* (2006.01)

(52) U.S. Cl.
CPC .......... *B60N 2/42709* (2013.01); *B60N 2/38* (2013.01); *B60N 2/4242* (2013.01); *B60N 2/42781* (2013.01)

(58) Field of Classification Search
CPC ............ B60N 2/42709; B60N 2/42736; B60N 2/42781; B60N 2/4242; B60N 3/06; B60N 3/066; F41H 7/046
USPC .............................. 297/216.1, 216.15–216.19
See application file for complete search history.

(56) References Cited

U.S. PATENT DOCUMENTS

| | | | | |
|---|---|---|---|---|
| 1,774,555 A | * | 9/1930 | Horsley | B61C 17/04 248/581 |
| 2,725,921 A | * | 12/1955 | Morris | B60N 2/0825 297/216.15 |
| 2,818,909 A | * | 1/1958 | Burnett | B60N 2/4221 296/68.1 |
| 2,916,081 A | * | 12/1959 | Pinkel | B60N 2/4214 244/122 R |
| 3,582,133 A | * | 6/1971 | DeLavenne | B60N 2/10 188/268 |
| 3,669,397 A | * | 6/1972 | Le Mire | B60N 2/4221 248/371 |
| 3,724,603 A | * | 4/1973 | Shiomi | B60N 2/4228 188/371 |
| 3,957,304 A | * | 5/1976 | Koutsky | B60N 2/4249 297/468 |

(Continued)

*Primary Examiner* — Shin H Kim
(74) *Attorney, Agent, or Firm* — John R. Benefiel

(57) ABSTRACT

A seat installation for a combat vehicle which protects an occupant from the effects of an explosion detonated beneath the vehicle in which breakaway structures are interposed between a seat pan and the vehicle floor which initially rapidly drives the seat up after the explosion, but which quickly breaks away to avoid spinal compression injury. A crushable energy absorbing structures thereafter absorb the floor motion, each structure comprised with a vertical stack of crushable energy absorbing cells which are successively crushed at higher force levels to adapt the seat installation to varying weight occupants. A pivoted foot rest provides spaced above the floor which mitigates injuries to the feet and legs by allowing the feet to avoid contact with the floor and which swing up and away from the floor while avoiding tipping of the seat.

10 Claims, 12 Drawing Sheets

(56) References Cited

U.S. PATENT DOCUMENTS

| | | | |
|---|---|---|---|
| 5,662,376 A * | 9/1997 | Breuer | B60N 2/4242 296/68.1 |
| 5,967,604 A * | 10/1999 | Yoshida | B60N 2/4221 248/429 |
| 6,142,563 A * | 11/2000 | Townsend | B60N 2/4228 297/216.1 |
| 6,257,663 B1 * | 7/2001 | Swierczewski | B60N 2/4214 297/216.16 |
| 6,672,667 B1 * | 1/2004 | Park | B60N 2/42754 297/216.1 |
| 8,297,698 B2 * | 10/2012 | Swierczewski | B60N 2/1615 297/216.1 |
| 8,641,140 B2 * | 2/2014 | Swierczewski | B60N 2/06 297/216.1 |
| 8,714,642 B2 * | 5/2014 | Lamparter | B60N 2/24 297/216.1 |
| 8,882,195 B2 * | 11/2014 | Kaessner | B60N 2/42709 297/216.19 |
| 8,926,012 B2 * | 1/2015 | Kaessner | B60N 2/4221 297/216.19 |
| 9,266,452 B2 * | 2/2016 | Haller | B60N 2/39 |
| 2003/0030319 A1 * | 2/2003 | Clapper | A47C 4/54 297/452.41 |
| 2004/0140137 A1 * | 7/2004 | Selig | B60N 2/002 177/144 |
| 2004/0174004 A1 * | 9/2004 | Smith | B60R 21/01532 280/735 |
| 2009/0267390 A1 * | 10/2009 | Honnorat | B60N 2/4242 297/216.16 |
| 2009/0267391 A1 * | 10/2009 | Honnorat | F16F 1/025 297/216.17 |
| 2010/0332079 A1 * | 12/2010 | Wang | B60N 2/4242 701/37 |
| 2011/0233975 A1 * | 9/2011 | Mindel | B60N 2/24 297/216.17 |
| 2012/0126592 A1 * | 5/2012 | Kaessner | B60N 2/42709 297/216.1 |
| 2012/0153697 A1 * | 6/2012 | Hibi | B60N 2/0232 297/344.24 |
| 2013/0193726 A1 * | 8/2013 | Rajasingham | B60N 2/005 297/216.12 |
| 2014/0007761 A1 * | 1/2014 | Haidar | F41H 7/042 89/36.02 |
| 2014/0339866 A1 * | 11/2014 | Olivares | B60N 2/24 297/216.17 |
| 2015/0300438 A1 * | 10/2015 | Elgy | B60R 21/04 188/377 |
| 2015/0300785 A1 * | 10/2015 | Lamparter | F41H 7/046 297/216.17 |

* cited by examiner

COMBAT VEHICLE SEAT INSTALLATION FOR PROTECTION OF OCCUPANTS FROM THE EFFECTS OF GROUND EXPLOSIONS

CROSS REFERENCE TO RELATED PATENT APPLICATIONS

This application claims the benefit of U.S. provisional application No. 62/299,040, filed on Feb. 24, 2016.

STATEMENT REGARDING FEDERALLY SPONSORED RESEARCH OR DEVELOPMENT

This invention was made with Government support under Contract W56HZV-15-C-0194 awarded by U.S. Army Tank Automotive Research Development and Engineering Center, Warren, Mich. The Government has certain rights in the invention.

BACKGROUND OF THE INVENTION

Combat ground vehicles such as tanks, personnel carriers, and Bradley combat vehicles are vulnerable to mines of other explosive devices buried in the ground, which creates an upward blast when detonated, imposing very high upwardly directed forces on the vehicle, which may seriously injure or kill the seated occupants.

When the vehicle drops back down and impacts the surface, lower forces are imposed on the occupants.

While the vehicle structures have been designed to withstand such blasts, there is a lack of energy absorbing seat installations that can adequately protect the solders in these vehicles from severe or fatal injuries to neck, spine, pelvis, legs and internal organs.

If the seat is directly attached to the floor via solid structures, this acceleration results in the sudden vertical acceleration of the seated occupants with the vehicle, potentially causing severe spinal compression-induced injuries. Also, due to the extreme vertical accelerations, the lower legs and feet are thrown upwards if the feet are directly contacting the vehicle floor at the time of the explosion, typically causing severe leg and/or foot injuries, often resulting in the need for amputation of one or both of the legs of the injured person.

To accelerate the occupant safely in the event of such an explosion, adequate energy absorbing structure may be provided that separates the seat pan from the floor so that the blast induced acceleration of the vehicle floor is not fully transferred into the seat pan and the occupant seated thereon.

If there is plenty of space between the seat pan and the vehicle floor (i.e., 15 inches or more) a crushable energy absorber with a very low constant crush load can be used to protect all of the various size occupants, especially against the upper body injuries (such as lumbar spine compression); and the feet may not even touch the floor with such seats well spaced above the floor so that foot and lower leg injuries may also be eliminated.

However, combat vehicles in the field have much less space, in the range of 6 to 9 inches below the seat pan. Therefore, protecting all of the soldiers of various sizes and weights from the effect of explosive blasts when occupying a seat in the vehicle seats is a challenge.

Further complicating the design of a blast worthy seat installation is the fact that soldiers now range considerably in size and weight and may or may not be wearing a heavily loaded back pack up to 65 lbs. The $5^{th}$ percentile female weighs 110 lbs. and is of a height of 5 feet, while the $95^{th}$ percentile male weighs 223 lbs. and is 6'2" in height, and the $50^{th}$ percentile male weighs 172 lbs. and is 5'9" in height.

Blast level tolerances are lowest for the $5^{th}$ percentile female and highest for the $95^{th}$ percentile male.

It is an object of the invention to better protect the occupant from the effects of an explosive blast by minimizing the injuries from the effects of a blast induced spinal compression, tibia (lower leg bone) compression and foot acceleration when a mine or other buried explosive device explodes under a combat vehicle, as well as possible injuries caused by the shock of the vehicle impacting the ground after being elevated by such an explosion.

SUMMARY OF THE INVENTION

The above object and other objects which will be understood by those skilled in the art are achieved by a seat installation comprised of three major components, which each reduce the chances of a serious injury to an occupant of the seat.

The first component is a breakaway connecting support of the seat pan on the vehicle floor, which initially is fully intact to briefly allow a direct transmission of the g forces into the seat pan in order to accelerate the seat sharply at the very beginning of the explosive blast. This support causes rapid initial upward acceleration of the seat pan, but which connecting support collapses quickly by a fracturing of the support, so as to avoid injury to the occupant by continuing of the initial acceleration.

The breakaway support advantageously takes the form of a vertically oriented V plates, each typically located at a respective end of the seat pan. The breakaway V plates are each connected at the bottom to the floor and at the top to an undersurface of the seat pan. Each V plate has a shallow bend line defining two similarly sized sections of the V plate creating a shallow inclination between the two sections. While the V plates are able to initially transmit high g forces, the bend line being a stress riser feature will cause initiation of a fracture at a predetermined loading which breaks the two sections apart.

Continued acceleration causes each plate section to completely fracture along the connection to the seat pan and floor allowing the two sections to collapse. This effectively insures removal of any structural connection between the seat pan and the floor through by the collapsed V plates.

The V plates thus cause a sharp acceleration the seat pan for a very brief initial interval, but that interval is short enough such that the movement of the seat pan is substantially taken up by the compression of soft tissues and some bone joints to thereby avoid excessive compression of the spine. This initial sharp movement has been determined to lower the peak forces causing spinal compression that would otherwise be generated.

The seat pan is thus caused to be briefly accelerated as much as possible without causing injury to the occupant.

A second component of the seat installation according to the invention comprises an energy absorbing structure, which is also interposed between the vehicle floor and the seat pan which, after the initial connection provided by the V plates collapses, progressively is crushed absorbing the increasing g forces thereafter, preferably in a stepped fashion so that each level is matched to weights and sizes of the vehicle seat occupants. The energy absorbing structure preferably comprises a vertically stacked series of rows of energy absorbing hollow cells are each progressively flattened in secession by a constant force level which increases with each cell, so that the force acting on a heavier occupant increases with each cell.

The cells are not completely flattened and rebound slightly so that the flattened energy cells absorb the forces which are generated when the vehicle drops back down and impacts the surface on which the vehicle comes to rest.

The third injury reducing component of the seat installation according to the invention is comprised of a pivoted foot rest which including a platform on which an occupant's feet rest to be supported which is pivotally mounted to the seat pan at one end. The platform is spaced above the floor so that contact with the floor is delayed. A breakaway support may be provided to the platform when an occupant steps on the platform. The foot rest pivots up after the floor moves through the space between the platform undersurface and the floor thereafter.

The pivoting of the foot rest avoids tipping of the seat while allowing upward movement to avoid contact with the floor moving rapidly up as a result of the explosion.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The present invention was developed using performing nonlinear, dynamic analysis of the seat under blast conditions using the LS-DYNA software and specialized models of the Hybrid III crash dummies. The performance described below is based on that analysis.

Figure 1:
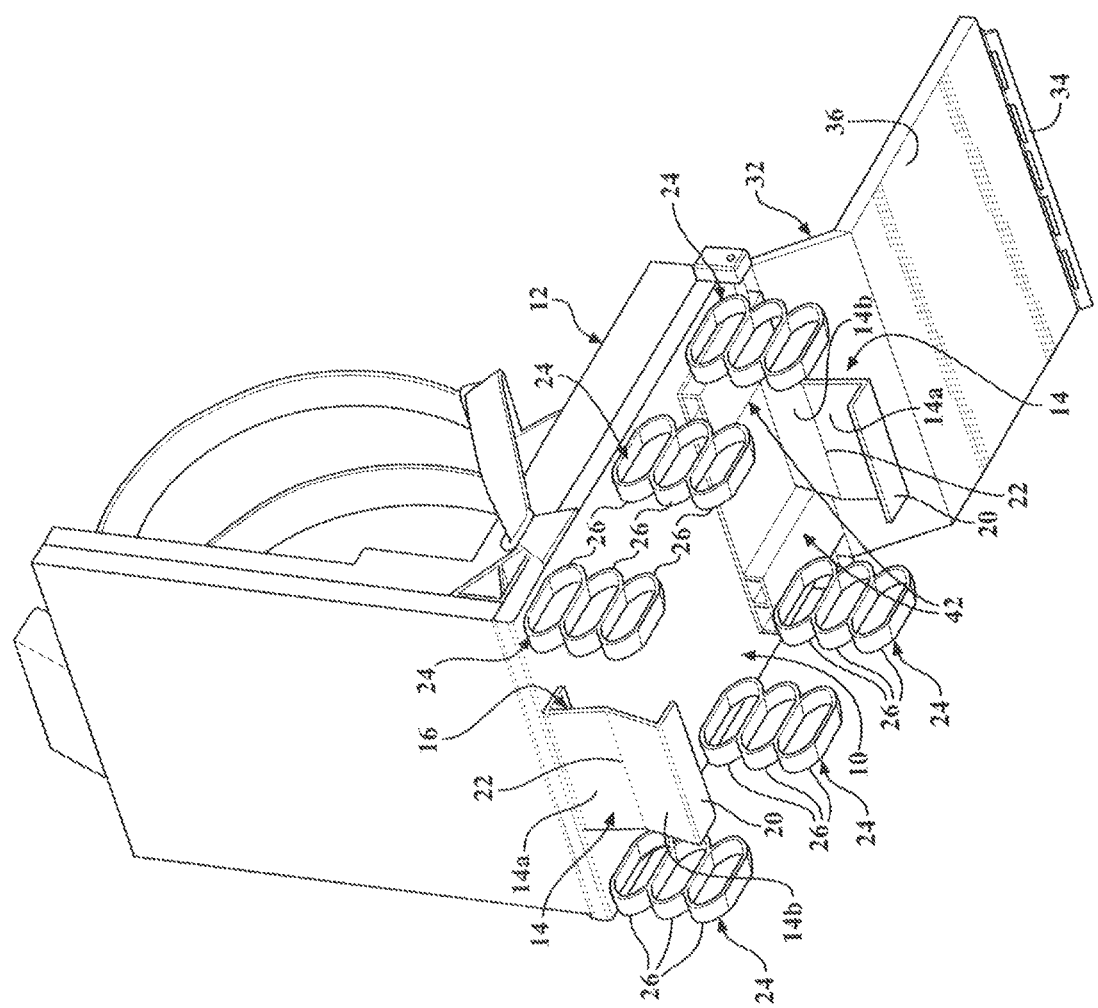
FIG. 1 is a pictorial view of a combat vehicle seat installation according to the present invention looking up towards the bottom of the seat pan to show the various components supporting the seat pan.
Figure 2:
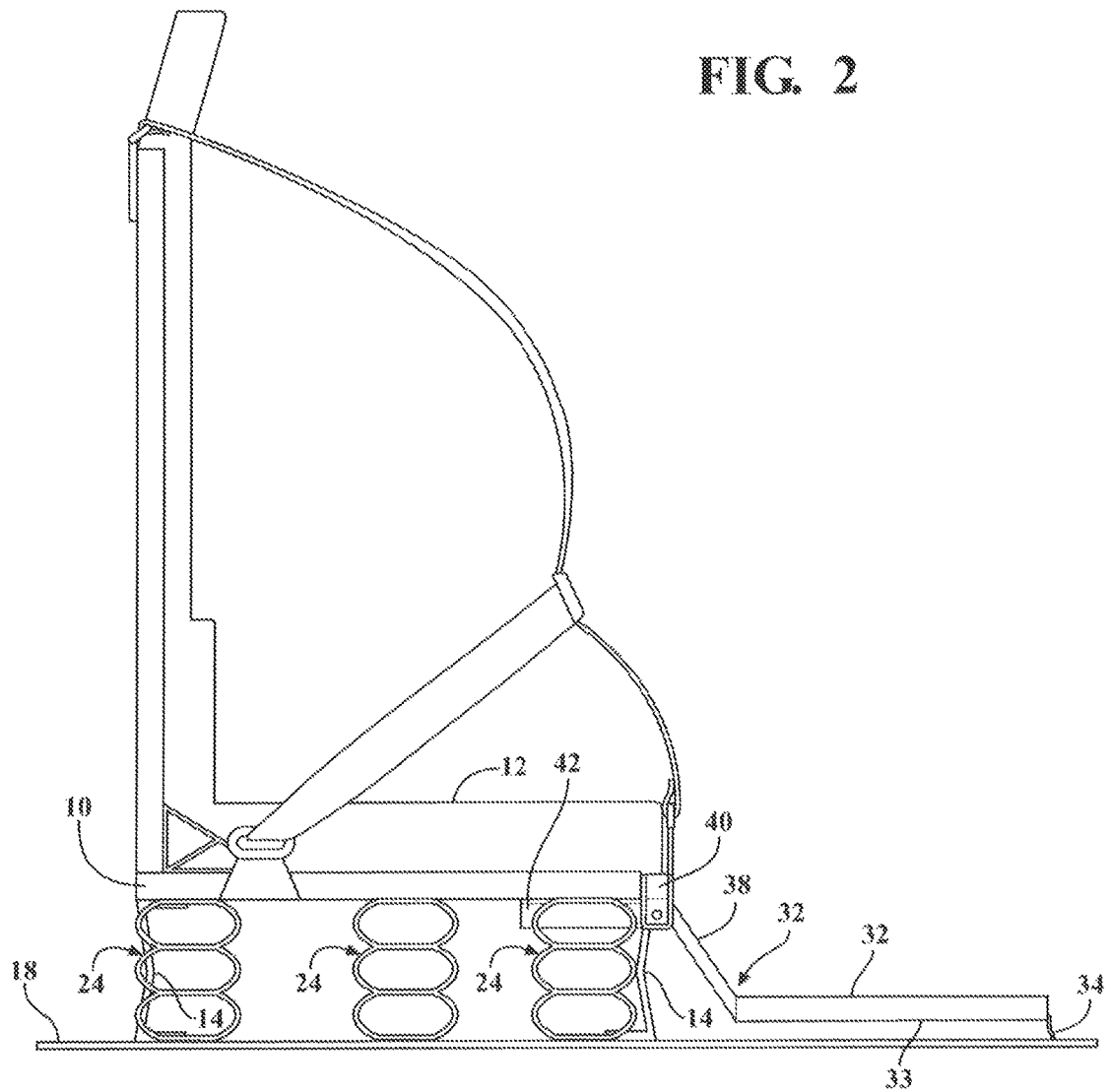
FIG. 2 is a side elevational view of the seat installation shown in FIG. 1.

Referring to FIGS. 1 and 2 the combat vehicle seat installation of the present invention includes vehicle floor mounting components for a seat floor pan 10, which holds a seat cushion 12 on which an occupant sits. These components include a breakaway support structure 14 which directly connects the vehicle floor 18 and the floor pan 10.

According to one feature of the present invention, it is desirable that the seat pan 10 be quickly accelerated very briefly for a short time (around 5 milliseconds) at the very beginning of the blast event. The present inventor determined that this movement will reduce the overall peak of the blast forces which causes spinal compression and is largely taken up by the soft tissue and in the joints initially so as to not itself cause substantial spinal compression.

Such breakaway structure may advantageously comprise a pair of generally vertically extending V plates 14, which are each attached at their upper end to the underside of the seat pan 10 by a flange 16 at the top and to the vehicle floor 18 (FIG. 2) by a flange 20. A shallow bend line 22 extending side to side horizontally across the width of each V plate 14, is formed intermediate the height of each V plate which defines a pair of sections 14A, 14B of each V plates 14. The V plates 14 are constructed of a brittle material such as sand cast aluminum to be brittle.

The V plates 14 initially directly connect the seat pan 10 to the floor 18 with initially minimal deformation when a blast occurs so that the seat pan 10 immediately begins to move upwardly.

Figure 9:
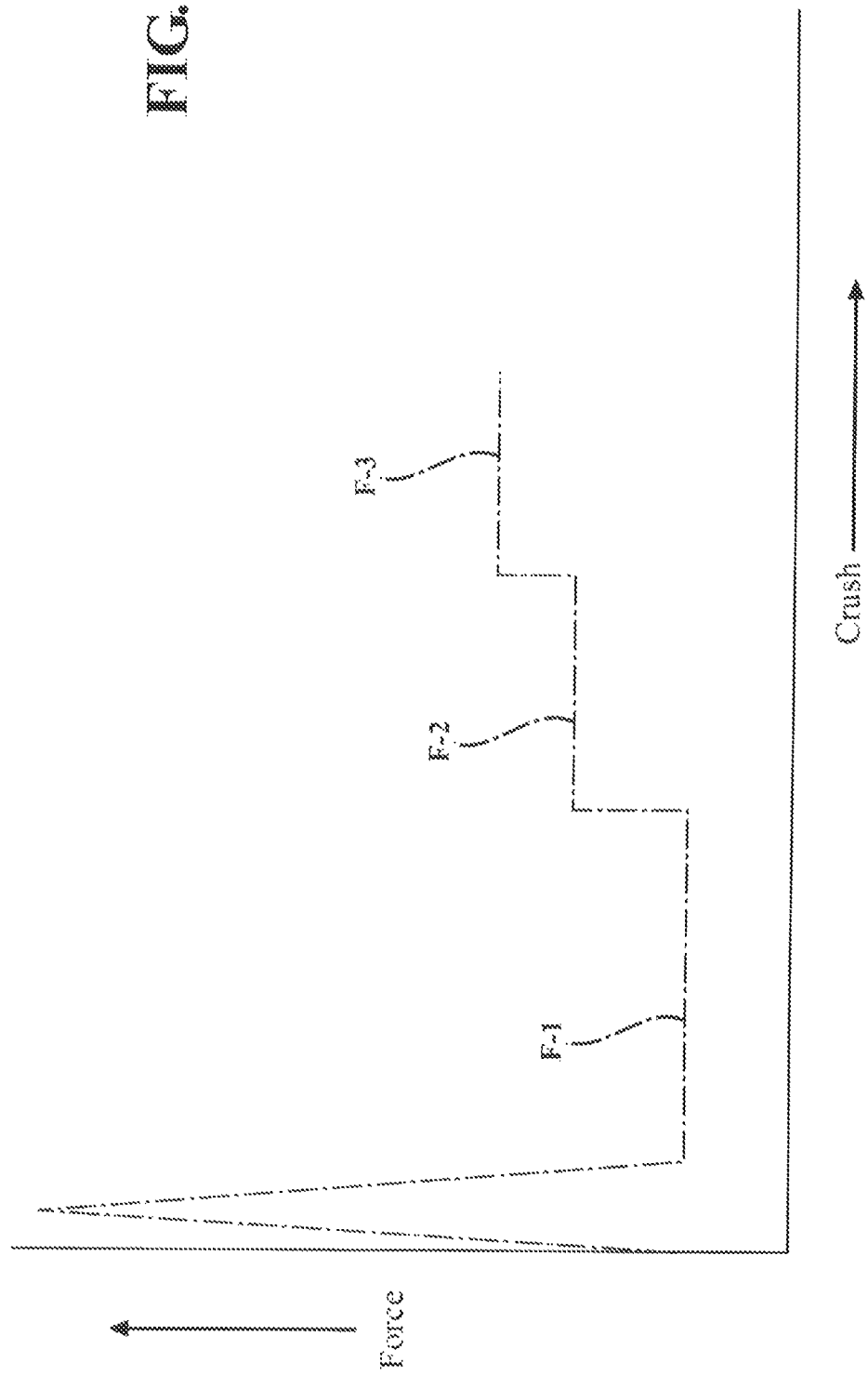
FIG. 9 is a plot of the force exerted on a seat pan during an initial stage where the breakaway structure is loaded and subsequently breaks away crushing of the energy absorbing structure included in the seat installation as shown in FIGS. 1-5.

The two sections 14A, 14B of the breakaway V plates 14 are designed to first break apart after a brief interval of a large force imposed thereon, on the order of 8 kN as depicted in FIG. 9.

Referring to FIGS. 12A-12D in the first stage the floor 18 moves slightly closer to the floor pan 10 causing the center line 22 to be stressed, as it acts a stress riser.

Figure 12A:
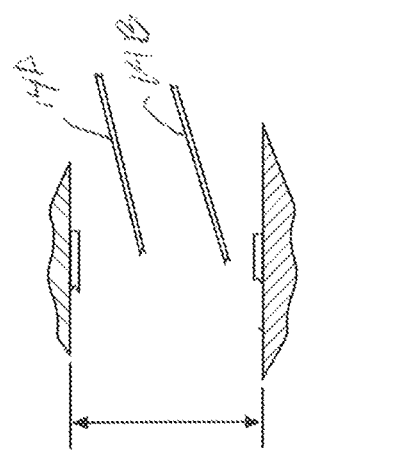
FIGS. 12A-12D are a step by step diagram depicting the breakaway action of one of a pair of V plates included in the seat installation shown in FIG. 1-6.
Figure 12B:
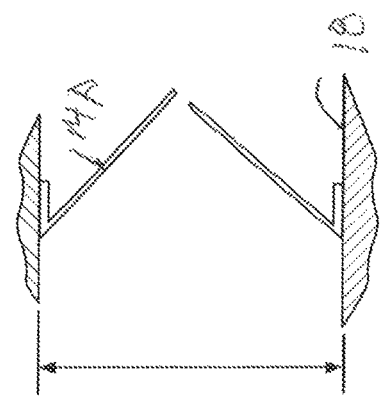

In the next stage shown in FIG. 12B, the two sections 14A, 14B break apart along the center line 22.

Figure 12C:
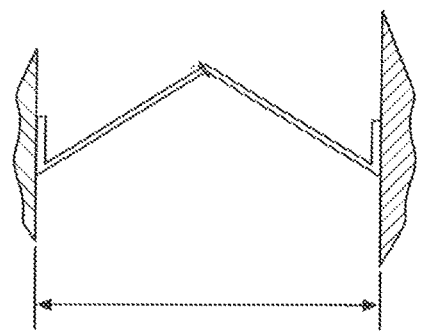
Figure 12D:
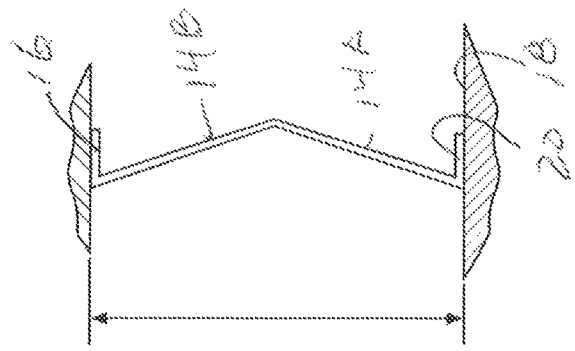

In the third stage, as seen in FIG. 12C as the floor 18 and seat pan 10 move closer together, the sections 14A, 14B are stressed along the junction of the flanges 16, 20 such that in last stage 12D both sections 14A, 14B break free and drop down to be flat against the floor 18 to insure that no significant transmission of force by the V plates 14 occurs.

Figure 10:
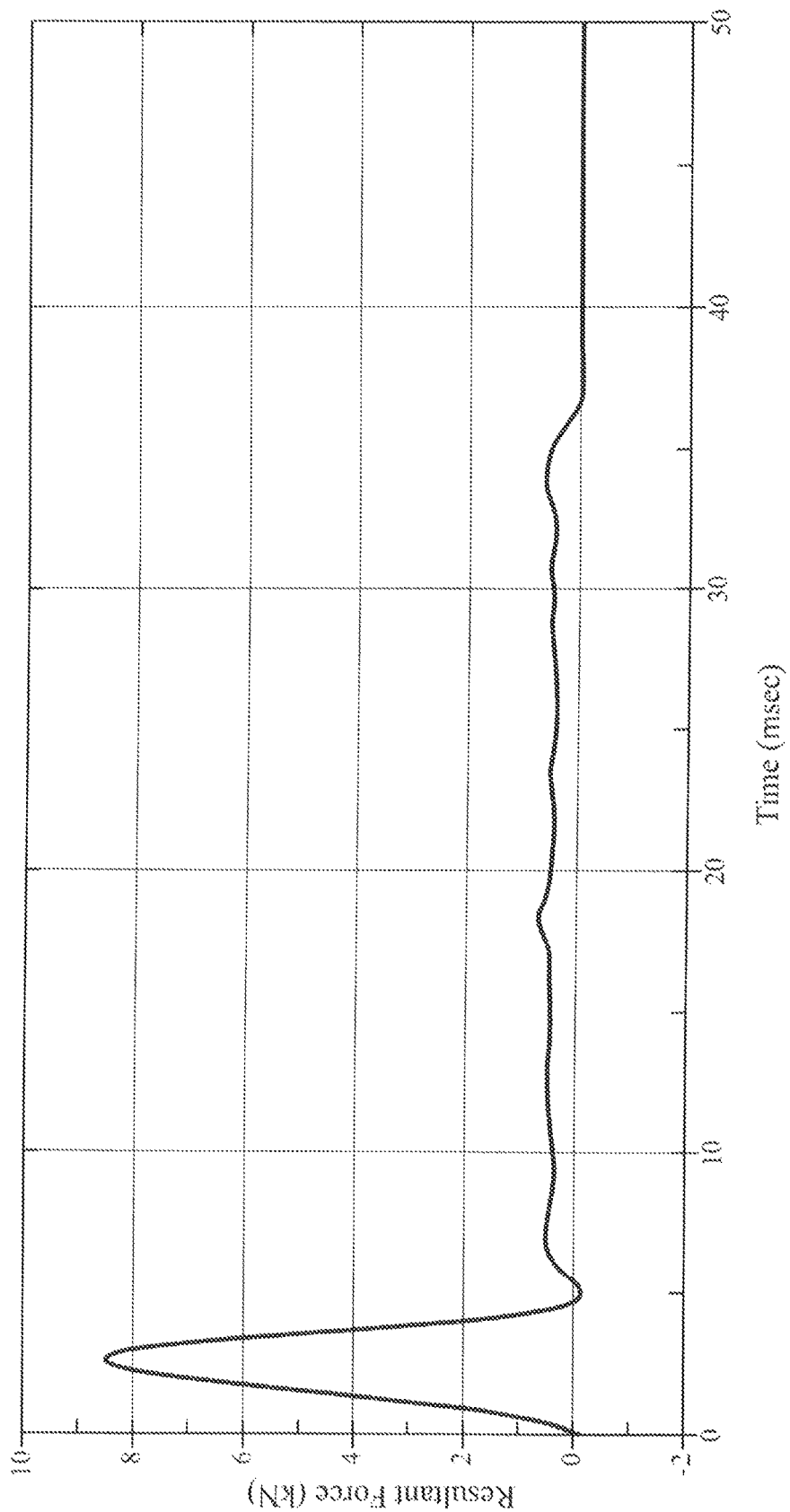
FIG. 10 is a plot of the force exerted on a seat pan by the breakaway structure versus time after an explosion occurs.
Figure 11:
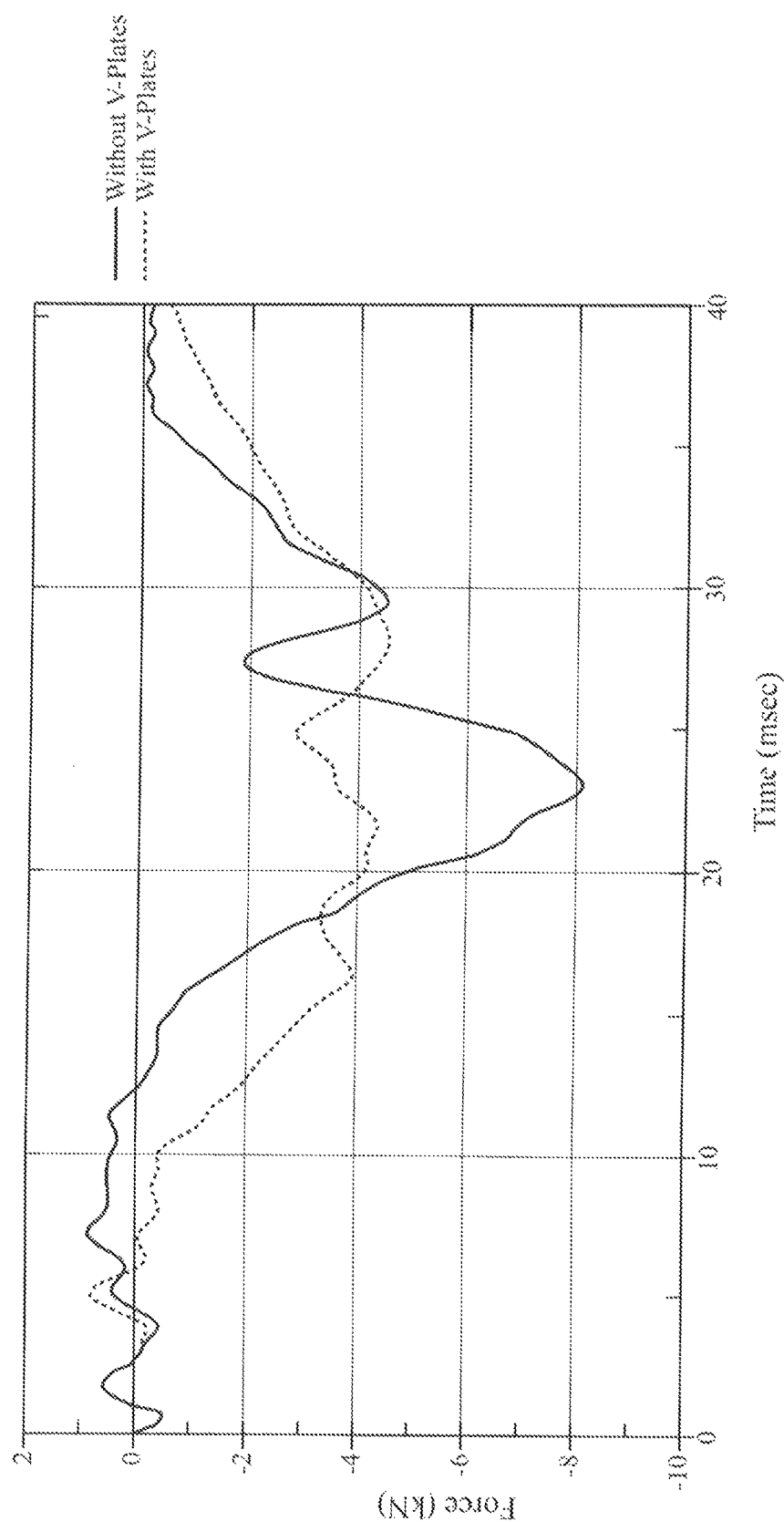
FIG. 11 is a plot of spine compression forces versus time produced with and without the breakaway structure.

Referring to FIG. 10, the forces generated tending to compress the lumbar with and without the breakaway structures are plotted versus times the large spike is eliminated due to the lowered acceleration later by early increased acceleration of the seat caused by the presence of the breakaway structure 14.

At this point, a second energy absorption component of the seat installation according to the invention assumes the load. This component comprises a series of energy absorber structures 24, mounted to also be interposed between the floor 18 and floor pan 10 are arranged along each side of the floor pan 10. As noted, when the V plates 14 break away, the energy absorber structures 24 assume the load created by the inertia of the seat and the occupant of the seat 10.

Figure 7:
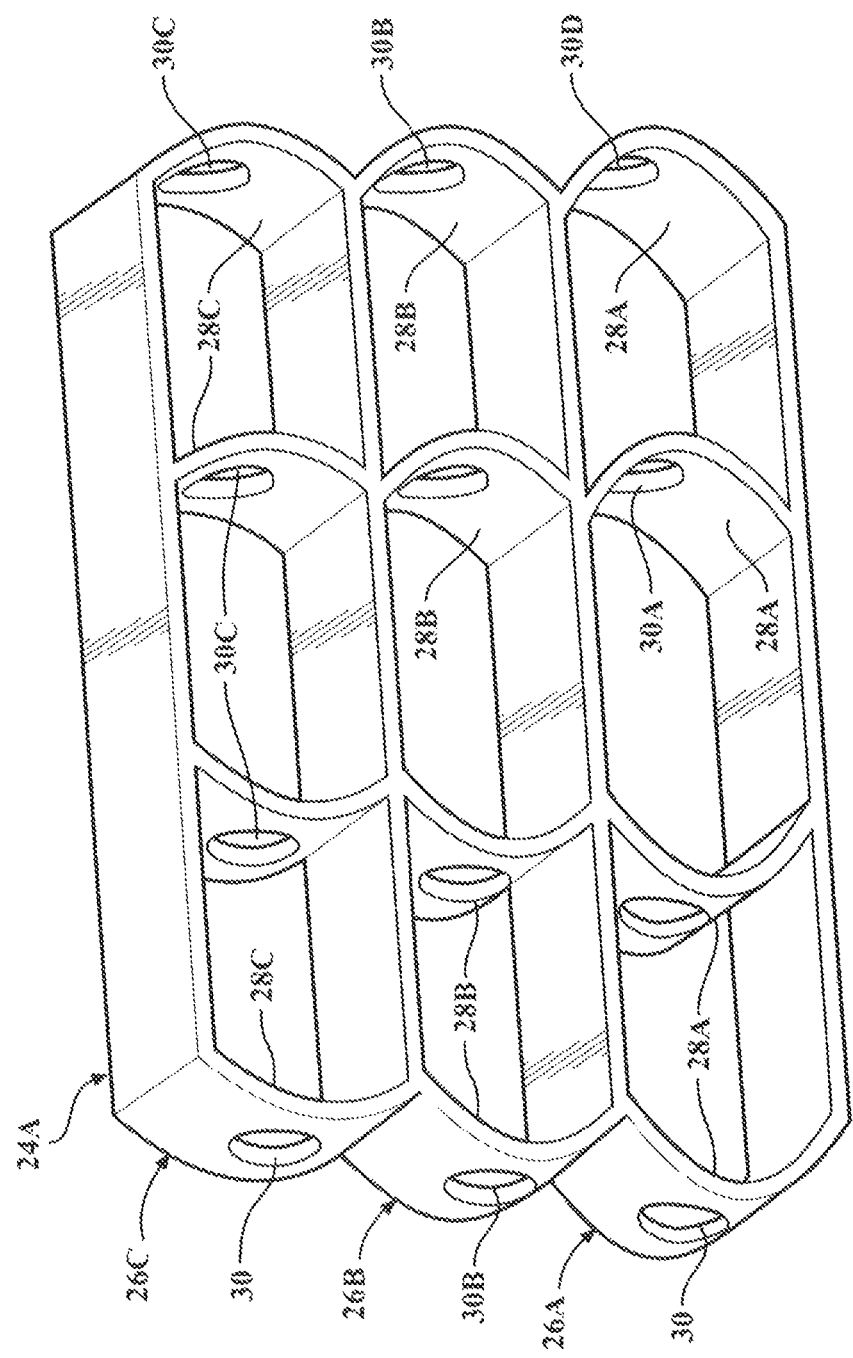
FIG. 7 is a pictorial view of a first embodiment of a multistage energy absorber structure which is included in the seat installation shown in FIGS. 1-6.
Figure 8:
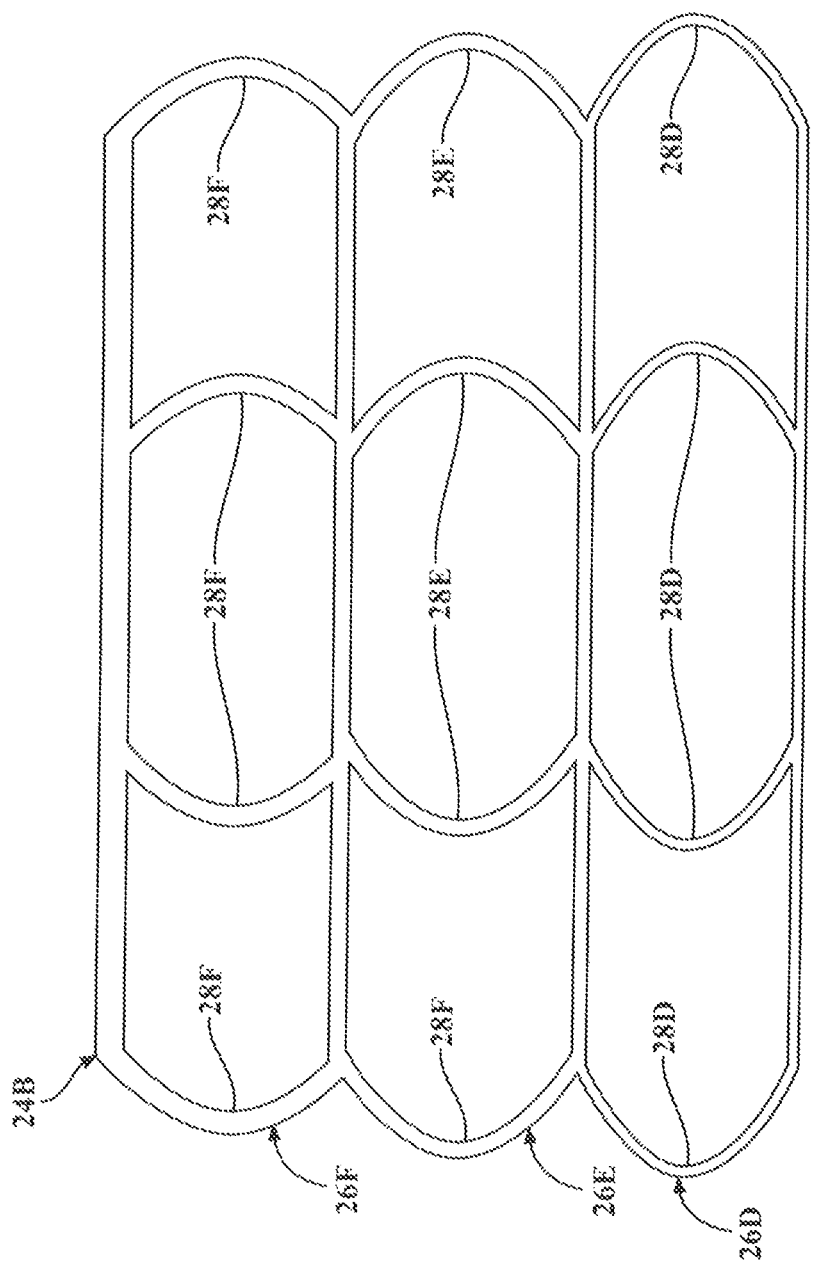
FIG. 8 is a pictorial view of a second embodiment of a multistage energy absorber structure included in the seat installation shown in FIGS. 1-6.

The energy absorber structures 24 shown in FIGS. 7 and 8 may be metal extrusions of a general type comprised of a series of web connected enclosed cells as described in U.S. Pat. No. 7,128,339 issued to the present inventor.

However, for this application, the inventor has determined that it is of particular benefit to form the energy absorber structure 24 as a plurality of vertically stacked hollow cells 26A, B, C (FIG. 7), each of which are each substantially flattened in succession by respective progressively increasing substantially constant load levels F1, F2, F3. Three or more levels are preferred, but more can be provided.

Military personnel occupying a combat vehicle may vary considerably in weight, and this vertically stacked cell construction allows a plurality of force crush ranges to reduce the compression forces exerted on the occupants of varying weights.

Figure 5:
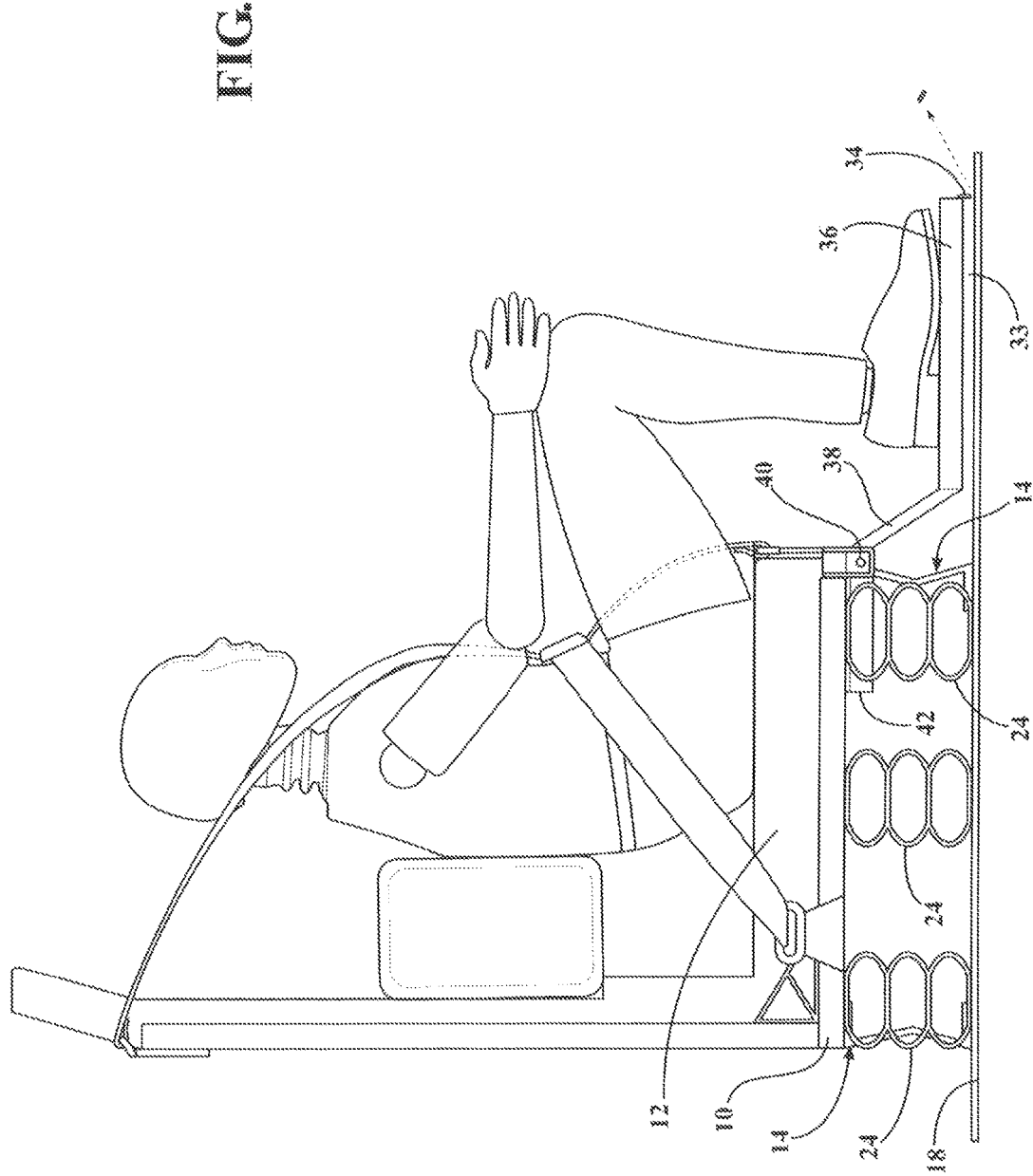
FIG. 5 is a side elevational diagrammatic representation of a person sitting in a combat vehicle seat installation shown in FIGS. 1-3 immediately after an explosive blast has occurred.
Figure 6:
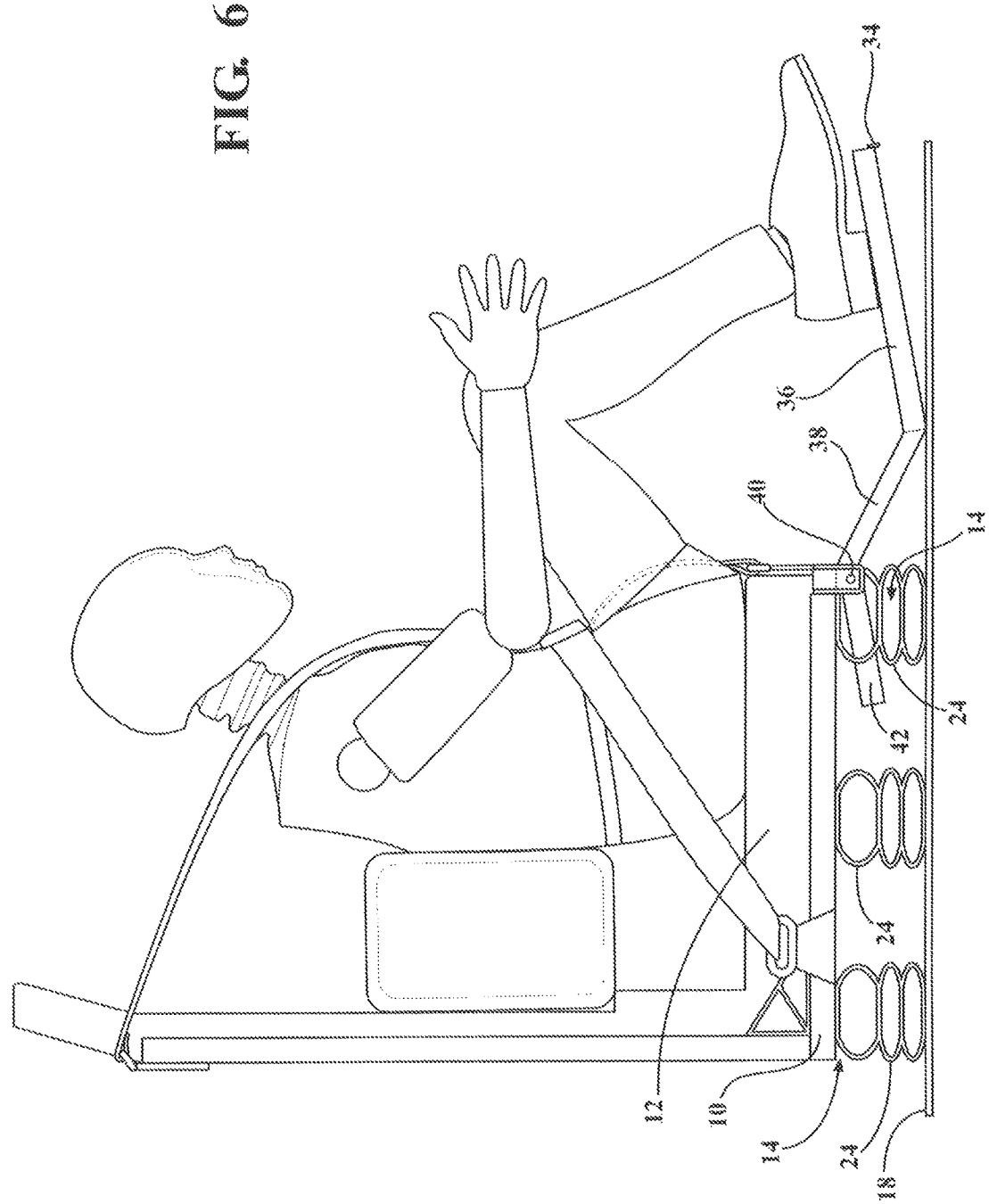
FIG. 6 is a side elevational diagrammatic representation of a person sitting in a combat vehicle seat installation shown in FIGS. 1-3 with continued movement after an explosive blast has occurred

This is seen in FIG. 9 where the lowest force level F-1 which corresponds to the $5^{th}$ percentile female occupant, crushes the first cell 26A (FIG. 5).

The second cell 26B (corresponding to $50^{th}$ percentile male occupant), is substantially crushed at a higher constant force F-2, and thereafter the third cell 26C substantially is completely crushed at a still higher constant force level F-3 (corresponding to the $95^{th}$ percentile male occupant).

Since lighter persons creates a lower inertia forces they can dissipate that force with a lower force crushability design. This also generally matches the varying ability of the occupants to absorb forces without being injured.

The varying crush strength of cells 26A-C may be achieved by various measures. In FIG. 7, the energy absorber structure 24 has varying curvature of the webs 28A with a smaller radius is at a minimum so that a lower force F1 causes flattening as seen in the lowest cell 26A.

The next higher cell 26B has webs 28B of a greater radius curvatures to be flattened at a higher constant force level F-2.

The uppermost cell 26C has the greatest radius curvature of the webs 26C and flattens at the highest constant force level F3.

Alternatively or additionally, holes 30A, B, C could be provided as shown which could be of a varying size to enable greater or lesser weakening of resistance to flattening of the webs 28A-C.

FIG. 8 shows another form of the stacked cell energy absorbing structure 24B wherein the thickness of successive cell webs 28D, E, F increases to increase the constant force level which will crush each cell 26D, E, F.

There could be more than three levels if space allows for a finer graduation of forces.

The energy absorbing structures 24 rebound slightly after being crushed, which enables the ground impact when the vehicle drops back down can be effectively absorbed thereby without injury.

Figure 3:
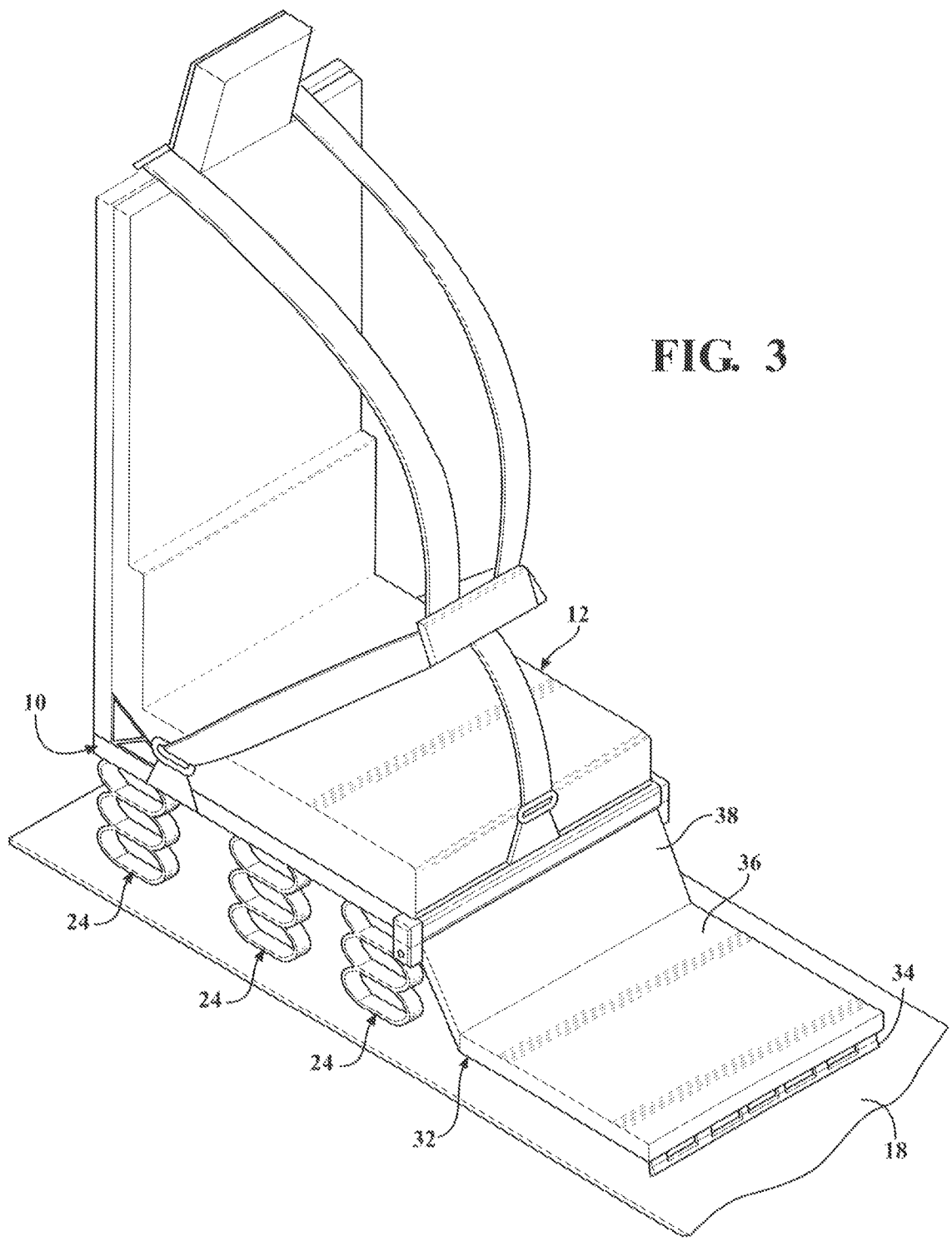
FIG. 3 is a pictorial view from above of the seat installation shown in FIGS. 1 and 2.
Figure 4:
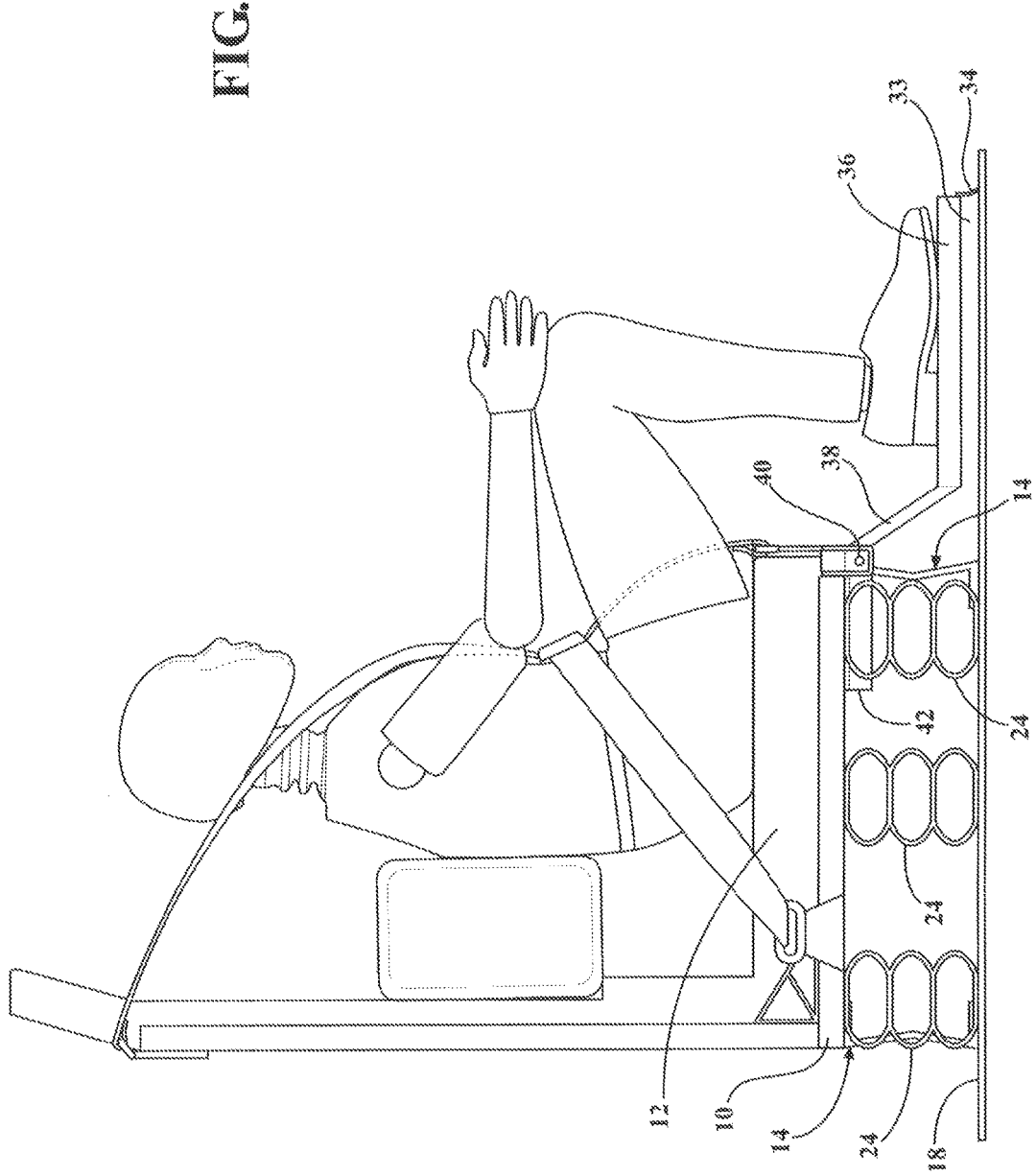
FIG. 4 is a side elevational diagrammatic representation of a person sitting normally in the combat vehicle seat installation shown in FIGS. 1-3.

The third seat installation component according to the present invention comprises a pivoted foot rest 32 (FIGS. 2-4). The foot rest 32 includes a platform 36 on which the occupants' feet could rest. It would be thought that the best way to absorb forces acting on a foot rest 34 is to interpose padding, foam or other crushable material between the foot rest platform 36 and the vehicle floor 18. However, the present inventor has determined that the best approach is to provide an air gap with no material interposed to initially prevent any contact of the floor.

Thus the platform 36 is not in direct contact with the floor 18 but rather is positioned a short distance above the floor, with a clearance air gap 33 (FIG. 4) between the platform 36 of the foot rest 32 and the floor 18. An easily frangible support 34 can be provided to allow an occupant to step on the platform 36 included in the foot rest 32 to be seated while maintaining the air gap 33 between the platform 36 and the floor 18.

The clearance air gap 33 has been determined to be effective to reduce injuries to the feet and legs of an occupant by avoiding any significant contact between the feet and the floor 18 at the beginning of an explosion.

The normally horizontally extending platform 36 is connected to an angled support plate 38 which in turn is supported on a hinge 40, allowing the platform 36 to pivot up in the event of an explosion (FIG. 5). Stopper pieces 42 keep the platform 36 from pivoting down to insure that the clearance gap 33 is maintained.

Accordingly, in the event of an explosive blast, the platform 36 initially is not moved up due to the clearance air gap 36 until the energy absorbing structures 24 crush sufficiently so the floor 18 can contact the underside of the platform.

Contact of the underside of platform 36 with the floor 18 causes pivoting up of the platform 36 about the hinge 40 (FIG. 5). This causes the feet of an occupant to swing away from the floor 18 which avoids the direct contact of the feet with the floor 18 and has been determined reduces the incidence and severity of injuries.

The vehicle seat offers the following advantages:

The installation has been estimated to weigh only about 60 lbs, made mostly of aluminum. Light weight seating contributes to lower overall vehicle weight and allows for easy air transport of combat and tactical vehicles to battlefields.

Proven high volume manufacturing (such as extrusion and casting) and assembly processes (such as cutting and welding) keep the cost of this seat down, especially at higher volumes of production. Also the simplicity of the proposed seat assembly (i.e., lack of any mechanism with intricate moving parts and the lack of sensors such as weight sensors, blast sensors, etc.) further lower costs.

The energy absorbing structure 24, V-plates 14 and the pivoting foot-rest 32 are highly tunable to various blasts pulses and occupants. For example, each of 3-cell 6 inch energy absorbing structures 24 offers over 27 variable parameters, i.e., (3 thicknesses, 3 curvatures, 3 hole sizes) that can be punched in each web) to obtain the needed dynamic characteristics for various blast pulses and occupant sizes.

Other than the hinged foot-rest, there are no moving parts in the seat installation of the invention. There are also no sensors required to reliably perform if a blast occurs. These factors will provide a very high reliability.

It has been shown that this seat can also provide protection even under such scenarios where the blast may not be centered below the vehicle but may be offset from the center. The energy absorbing structure can crush and collapse regardless of the direction of the loading without locking or binding typically seen in crushing structures.

Blast protection is provided from unencumbered $5^{th}$ percentile female occupant to fully encumbered $95^{th}$ percentile male occupant. Five difference occupant configurations have been studied here: 1) unencumbered $5^{th}$ percentile occupant, 2) 65 lbs encumbered $5^{th}$ female occupant, 3) unencumbered $50^{th}$ percentile male occupant, 4) unencumbered $95^{th}$ percentile male occupant and 5) 65 lbs encumbered $95^{th}$ percentile male occupant. It is believed that 65 lbs encumbered $50^{th}$ percentile male occupant will also be protected because of the lower bound and upper bounds established via the 5 other occupant configurations.

The invention claimed is:

1. A seat installation for a combat vehicle seat including a seat pan supported on a floor of said vehicle by a breakaway structure which connects said seat pan and said floor so as to initially cause said floor to drive up said seat pan immediately after an explosion occurs but thereafter disconnects said connection therebetween by breaking away quickly enough to thereby avoid an injurious spinal compression said breakaway structure comprising:
　a pair of V plates, each V plate located on respective ends of said seat pan and having a bend line extending side to side across a middle region of said V plate to divide said V plate into two sections extending at a shallow angle with respect to each other;
　a top section of each V plate attached at a top end to an undersurface of said seat pan and a bottom section of each V plate attached to said floor of said vehicle, whereby said seat pan is initially driven upward by said V plates at a bottom end by movement of said combat vehicle floor upon detonation of an explosion beneath said combat vehicle;
　each of said V plates breaking apart after a sufficiently brief interval after said explosion so as to reduce spinal compression injuries.

2. The seat installation according to claim 1 wherein each V plate initially breaks apart along said bend line.

3. The seat installation according to claim 2 wherein each of said V plates subsequently breaks away from said attachments to said seat pan and floor at the top and bottom.

4. The seat installation of claim 1 further including energy absorbing structures interposed between an undersurface of said seat pan and said floor at front and rear ends of said seat pan, which energy absorbing structure is progressively crushed as said vehicle floor moves up after an explosion occurs beneath said vehicle and breakaway structure after said break apart.

5. The seat installation according to claim 4 wherein each of said energy absorbing structures includes a vertical stack of at least three hollow cells which are crushed as a result of a sever blast of an explosive device.

6. The seat installation according to claim 5 wherein each of said cells are flattened successively at increasing force levels to thereby provide energy absorption for respective weights for different occupants.

7. The seat installation according to claim 4 further including a foot rest pivotally connected to said seat pan at a forward end configured to allow an occupant's feet to rest thereon, said foot rest normally spaced above said floor but pivoted up by contact of said foot rest with said floor caused by an explosion.

8. The seat mounting according to claim 6 wherein said foot rest further comprises a platform extending away from a front end of said seat pan and pivotally mounted to said front end of said seat pan by an angled plate pivoted along a rear side to said front end of said seat pan and sloping downwardly at an angle from said seat pan and joined at a front side thereof at an angle to said platform; and,
　at least one stop plate connected to said rear side of said angled to said plate and extending beneath said seat pan to engage an underside thereof and normally position said platform spaced above said floor.

9. The seat installation according to claim 8 further including a support interposed between said platform and said floor to allow an occupant to be supported on said platform but which breaks off when an explosion occurs to initially prevent pivoting of said platform.

10. A seat installation for a combat vehicle seat, including a foot rest pivotally connected to a seat pan at a forward end thereof to allow an occupant's feet to rest thereon, said foot rest normally spaced above said floor, but pivoted up by contact with said floor caused by a severe explosion, said foot rest comprising a platform extending away from a front side of said pan and pivotally mounted to said floor, said platform having an angled connector plate attached and sloping downwardly at an angle from a front end of said seat pan and joined at an angle to said platform; and,
　said angled connector plate pivotally mounted to said seat pan, and a stop plate connected to said angled connector plate and extending beneath said seat pan to engage an underside thereof and normally position said platform section spaced above said floor.

\* \* \* \* \*